United States Patent [19]

Suzuki et al.

[11] Patent Number: 4,773,010
[45] Date of Patent: Sep. 20, 1988

[54] APPARATUS FOR DETECTING DRIVING CONDITION OF AUTOMOTIVE VEHICLE

[75] Inventors: Mikio Suzuki, Hekinan; Masaaki Hayashi, Okazaki, both of Japan

[73] Assignee: Toyoda Koki Kabushiki Kaisha, Kariya, Japan

[21] Appl. No.: 842,154

[22] Filed: Mar. 21, 1986

[30] Foreign Application Priority Data

Mar. 22, 1985 [JP] Japan .................................. 60-58750

[51] Int. Cl.$^4$ .......................... G06F 15/20; B62D 5/04
[52] U.S. Cl. ................................ 364/424.05; 180/142; 180/79.1
[58] Field of Search ................. 364/424; 180/79, 79.1, 180/141, 142

[56] References Cited

U.S. PATENT DOCUMENTS

| 4,437,532 | 3/1984 | Nakamura et al. | 180/142 |
| 4,471,280 | 9/1984 | Stack | 318/586 |
| 4,602,695 | 7/1986 | Takeshima et al. | 180/143 |
| 4,621,327 | 11/1986 | Dolph et al. | 180/79.1 |
| 4,651,840 | 3/1987 | Shimizu et al. | 180/79.1 |
| 4,653,601 | 3/1987 | Nakamura et al. | 180/79.1 |
| 4,657,103 | 4/1987 | Shimizu | 180/79.1 |
| 4,662,466 | 5/1987 | Eto et al. | 180/142 |

Primary Examiner—Gary Chin
Attorney, Agent, or Firm—Oblon, Fisher, Spivak, McClelland & Maier

[57] ABSTRACT

In an automotive vehicle equipped with an electrically power-assisted steering system including an electric motor in drive connection to a steering shaft to produce an assist power in accordance with the driver's effort applied to the steering shaft, a signal is produced at each travel of the vehicle in a predetermined distance, and a physical value related to the assist power of the motor is detected in response to the signal. When the number of times of detection of the physical value reaches a predetermined time, a characteristic value of the detected physical values is calculated and compared with a standard value to determine a driving condition of the vehicle on a basis of the comparison.

5 Claims, 4 Drawing Sheets (a)

(b)

(a)

(b)

4,773,010

APPARATUS FOR DETECTING DRIVING CONDITION OF AUTOMOTIVE VEHICLE

BACKGROUND OF THE INVENTION

1. Field of the Invention

The present invention relates to an apparatus for detecting a driving condition of an automotive vehicle, and more particularly to an apparatus for detecting a driving condition such as street travel, mountain travel, highway travel or the like of an automotive vehicle equipped with an electrically power-assisted steering system.

2. Description of the Prior Art

In a conventional hydraulic power-assisted steering mechanism, a ratio of a total steering torque applied to the steerable road wheels and a manual steering torque applied to the steering shaft is controlled in dependence upon a vehicle speed, a steering angle, a steering speed, a road condition and the like to enhance steering feel and stability. To further enhance the steering feel and stability, it is required to control the foregoing ratio in accordance with a driving condition such as street travel, mountain travel, highway travel or the like of the vehicle. It is also desirable that such a driving condition of the vehicle is adapted as an improtant parameter for automatic control of a suspension system, a height control system, a proportion of braking forces acting on front and rear road wheels or the like. Theoretically, such a driving condition of the vehicle can be detected by detection of distribution of rotation angles of the steering shaft in relation to a travel distance of the vehicle. In this method, it is, however, required to use an expensive steering angle detector. Additionally, it is impossible to detect a driving condition of the vehicle in relation to a manual steering torque applied to the steering shaft.

SUMMARY OF THE INVENTION

It is, therefore, a primary object of the present invention to provide an apparatus capable of detecting in a simple and reliable manner a driving condition of an automotive vehicle equipped with an electrically power-assisted steering system.

According to the present invention there is provided an apparatus for detecting a driving condition of an automotive vehicle equipped with an electrically power-assisted steering system which includes an electric motor drivingly connected to a steering shaft to produce an assist power in accordance with a manual steering torque applied to the steering shaft and apply it to the steering shaft. The apparatus includes first means for producing a first signal at each travel of the vehicle in a predetermined distance, second means responsive to the first signal for detecting a physical value related to the assist power of the electric motor, third means for determining whether or not the number of times of detection of the physical value reaches a predetermined time if so, producing a first determination signal and if not, producing a second determination signal, fourth means responsive to the first determination signal for calculating a characteristic value of the detected physical values, and fifth means for comparing the calculated characteristic value with a standard value and for determining a driving condition of the vehicle on a basis of the comparison.

In the actual practice of the present invention, it is preferable that the physical value is a load current of the electric motor and the characteristic value represents a variance of the detected physical values.

BRIEF DESCRIPTION OF THE DRAWINGS

Other objects, features and advantages of the present invention will become more readily apparent from the following detailed description of a preferred embodiment thereof when taken together with the accompanying drawings, in which.

DETAILED DESCRIPTION OF THE PREFERRED EMBODIMENT

Figure 1:
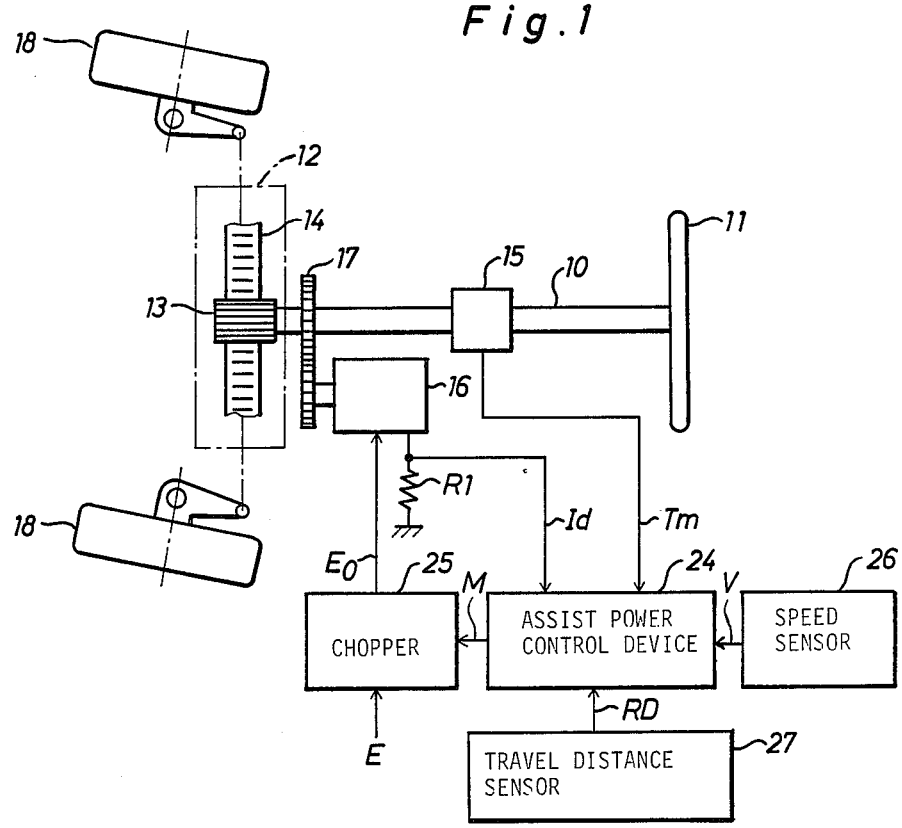
FIG. 1 is a schematic illustration of a block diagram of a control apparatus for an electrically power-assisted steering system.

Referring now to the drawings, FIG. 1 illustrates a block diagram of a control apparatus for an electrically power-assisted steering system which includes a steering shaft 10 provided at its upper end with a steering wheel 11 and formed at its lower end with a pinion 13 rotatably mounted within a gear box 12. The pinion 13 is in mesh with a rack member 14 which is laterally movably mounted within the gear box 12 and operatively connected at its opposite ends with steerable road wheels 18, 18 through suitable link mechanisms as is well-known in the art. The steering shaft 10 is provided thereon with a torque sensor 15 which is arranged to detect a manual steering torque Tm applied to the steering wheel 11. In this power-assisted steering system, an electric D.C. motor 16 is operatively connected to the steering shaft 10 by means of a gear train 17 to apply an assist power Ta to the steering shaft 10.

The electric motor 16 is connected through a chopper 25 to a DC voltage source in the form of a rectifier in connection to an alternator driven by a prime mover of the vehicle. The chopper 25 is connected to an assist power control device 24 which is arranged to be applied with a torque signal Tm indicative of the manual steering torque from the torque sensor 15, a speed signal V indicative of a vehicle speed from a speed sensor 26, a feed-back signal indicative of a load current Id from a load detection circuit $R_1$ of the electric motor 16, and a pulse signal RD indicative of a travel distance of the vehicle from a travel distance sensor 27. In this embodiment, for instance, the speed sensor 26 is arranged to generate a voltage signal corresponding to the rotational speed of a propeller shaft of the vehicle, and the travel distance sensor 27 is provided with a switch element (not shown) which is responsive to the rotation of the propeller shaft so as to produce the pulse signal RD at each travel of the vehicle in 0.5 m. The assist power control device 24 is responsive to the signals Tm, V and RD to determine an optimum assist power in dependence upon the vehicle speed, the manual steering torque and the travel distance thereby to produce a control signal M indicative of the difference between the optimum assist power and an actual assist power represented by the load current Id. The chopper 25 is responsive to the control signal M to modulate the power applied to the electric motor 16 so that the actual assist power coincides with the optimum assis power.

Figure 2:
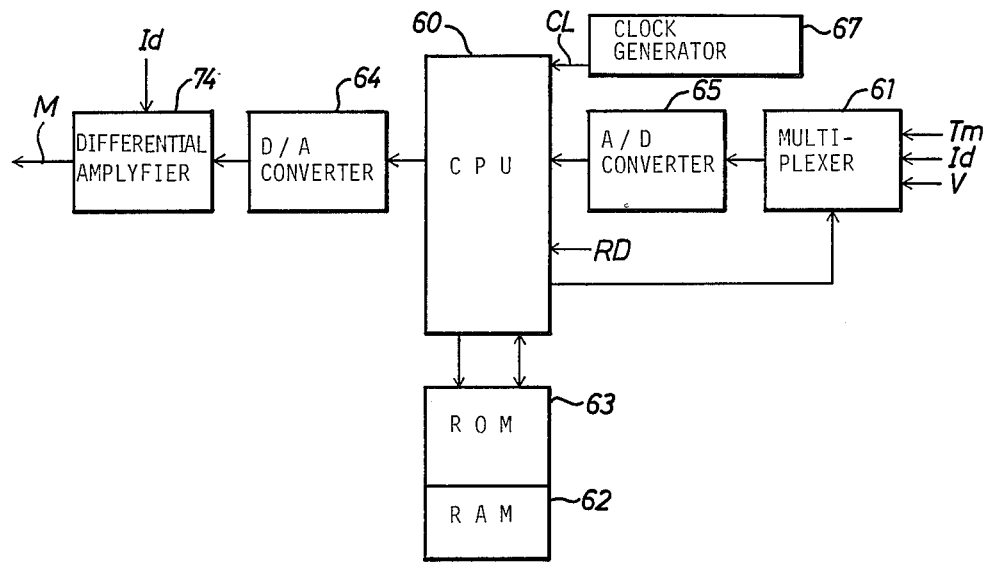
FIG. 2 is a schematic illustration of a block diagram of an assist power control device shown in FIG. 1.
Figure 3:
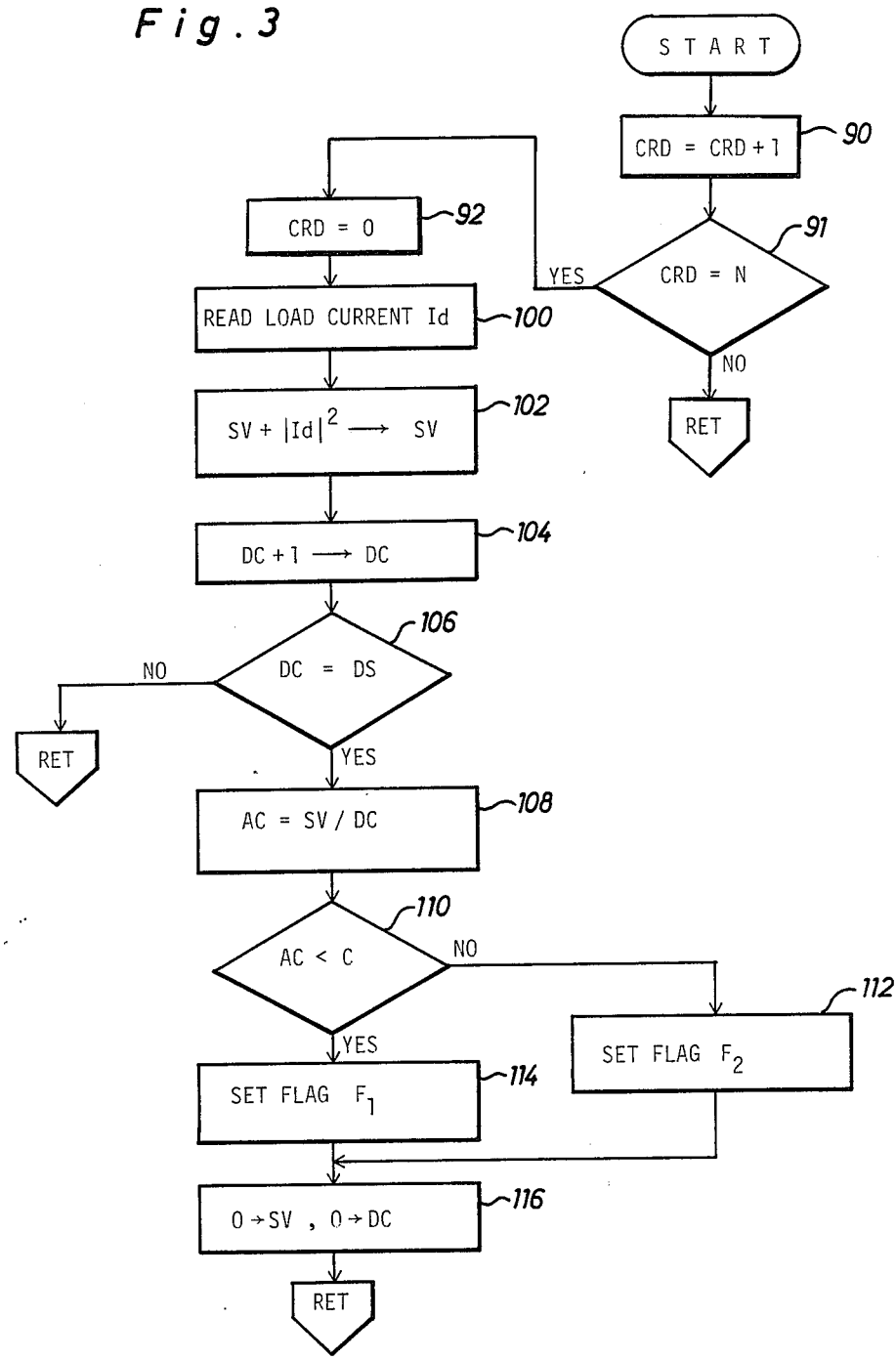
FIG. 3 is a flow chart of a first control program for the assist power control device.
Figure 4:
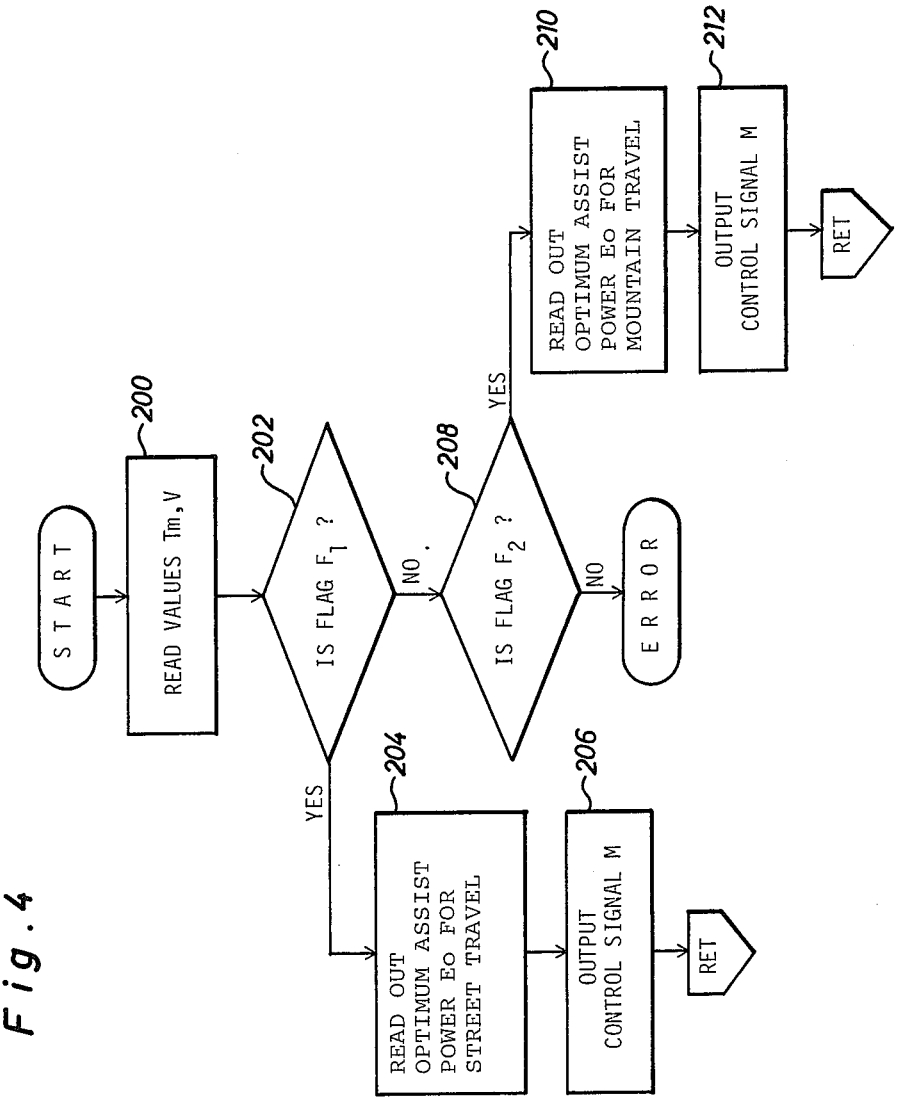
FIG. 4 is a flow chart of a second control program for the assist power control device.
Figure 5:
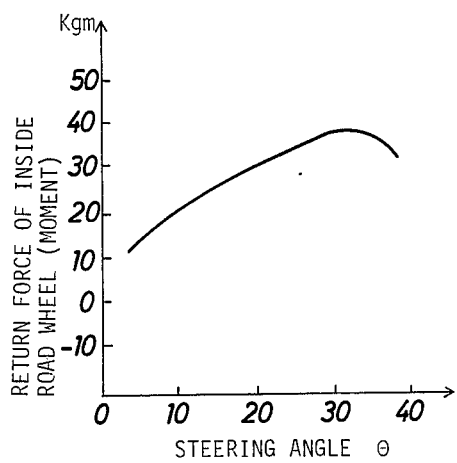
FIG. 5 illustrates a relationship (a) between a return force of the inside steerable road wheel and a steering angle and a relationship (b) between a return force of the outside steerable road wheel and a steering angle.
Figure 5:
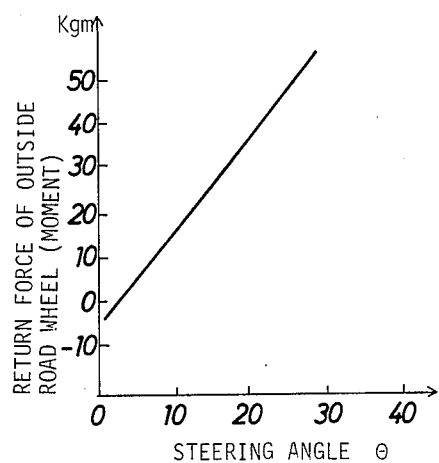

As is schematically illustrated in FIG. 2, the power assist control device 24 comprises a multiplexer 61 arranged to be applied with the torque signal Tm, the feed-back signal indicative of load current Id and the speed signal V, a microcomputer including a central processing unit or CPU 60 connected to the multiplexer 61 through an analog-to-digital or A/D converter 65, a random access memory or RAM 62 arranged to temporarily memorize input data such as each instantaneous value of the signals Tm, V and load current Id, and a read-only memory or ROM 63 arranged to store first and second control programs shown in FIGS. 3 and 4 and to store data for determination of the optimum assist power, and a differential amplifier 74 connected to the CPU 60 through a digital-to-analog or D/A converter 64 and connected to the load circuit of electric motor 16 to produce an output signal indicative of a difference between the instantaneous load current Id and an optimum load current defined by the optimum assist power. The chopper 25 is connected to the differential amplifier 74 to modulate the power from the DC voltage source under control of the output signal from the differential amplifier 74.

The first control program of FIG. 3 is designed to detect various driving conditions of the vehicle. The CPU 60 is arranged to initiate execution of the first control program in response to the pulse signal RD applied thereto from the travel distance sensor 27. At step 90 of the program, the CPU 60 adds "1" to a count value CRD for measurement of a travel distance and causes the program to proceed to step 91 where the CPU 60 determines as to whether or not the count value CRD reaches a predetermined value N, for instance, "20". If the answer is "No", the program will return to a main rountine program (not shown). If the answer is "Yes", the program will proceed to step 92 where the CPU 60 resets the count value CRD. As will be described later, the value N is determined to define a time for sampling the load current Id of electric motor 16. Thus, the following steps 100 to 106 of the program will be executed at each travel of the vehicle in 10 m. When the program proceeds to step 100, the CPU 60 reads out an instantenous load current Id of electric motor 16 and causes the program to proceed to step 102 where the CPU 60 adds a square value of load current Id to a value SV (=0). At the following step 104, the CPU 60 adds "1" to a value DC and causes the program to proceed to step 106 where the CPU 60 determines as to whether or not the value DC reaches a value DS which is determined to define a predetermined travel distance, for instance, 1 km. If the answer at step 106 is "No", the above execution of the program will be repeated. If the answer at step 106 is "Yes", the program will proceed to step 108 where the CPU 60 calculates an average AC of a sum SV of square values of load current Id on a basis of an equation AC=SV/DC. In this instance, the average AC is calculated as a distribution or variance of the load currents Id read out during travel of the vehicle in 1 km. In addition, the execution at step 108 is carried out on a basis of the following equation.

$$V = \frac{1}{n-1} \sum_{i=1}^{1} (x_i - \overline{x})^2$$

where the execution at step 102 corresponds to the calculation of $$\sum_{i=1}^{1} (x_1 - \overline{x})^2$$

in the above equation.

Figure 6:
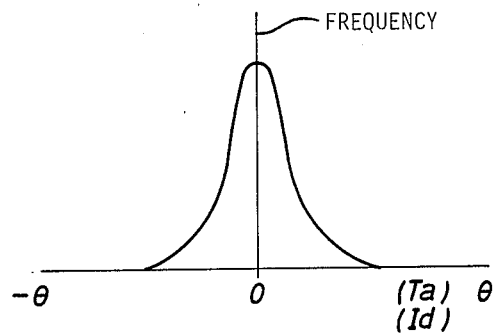
FIG. 6 illustrates frequency distribution of physical values related to assist power.
Figure 6:
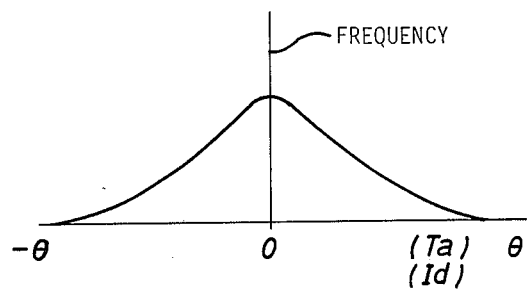

When the program proceeds to step 110, the CPU 60 determines as to whether or not the calculated average or variance AC is smaller than a predetermined value C. If the answer is "Yes", the sampled load currents Id have a variance shown in FIG. 6 (a) and the program proceeds to step 114 where the CPU 60 sets a flag $F_1$ indicative of street travel of the vehicle. If the answer is "No", the sampled load currents Id have another variance shown in FIG. 6 (b) and the program proceeds to step 112 where the CPU 60 sets a flag $F_2$ indicative of mountain travel of the vehicle. At the following step 116, the CPU 60 resets the respective values SV and DC and causes the program to return to the main rountine program. Thus, the execution of the first control program will be repeated to detect a driving condition of the vehicle at each time the vehicle runs 1 km.

Although the first control protgram has been designed to detect a driving condition of the vehicle at each travel distance of 1 km, the program may be modified to renew load currents Id cumulated during the travel of 1 km on a first-in first-out basis at each time a new load current Id is sampled, to calculate the variance AC of the cumulated load currents Id through those processings executed at steps 102 and 108 and finally to compare the calculated variance AC with the predetermined value C as performed at step 110. In such a case, it is able to detect a driving condition of the vehicle at each travel distance of 10 m.

The second control program of FIG. 4 is designed to control the assist power Ta in dependence upon the driving condition detected above. In this embodiment, the CPU 60 is arranged to initiate execution of the second control program in reponse to an interrupt signal CL applied thereto from a real-time clock signal generator 67 shown in FIG. 2. At step 200 of the program, the CPU 60 reads out respective values of the torque singal Tm and speed signal V and causes the program to proceed to step 202 where the CPU 60 ascertains whether the flag $F_1$ is in set state or not. If the answer is "Yes", the program proceeds to step 204 where the CPU 60 reads out from the ROM 63 one of a first group of optimum assist powers Eo suitable for street travel of the vehicle on a basis of the detected manual steering torque Tm and the detected vehicle speed V. At the following step 206, the CPU 60 produces an output signal indicative of the read out optimum assist power Eo. Thus, the differential amplifier 74 is applied with the output signal from the CPU 60 through the D/A converter 64 to produce a control signal M indicative of a difference between a value of the instantaneous load current Id and the optimum assist power Eo, and the chopper 25 is applied with the control singal M to modulate the voltage applied to electric motor 16 in accordance with a value of the control signal M. If the answer at step 202 is "No", the program proceeds to step 208 where the CPU 60 ascertains whether the flag $F_2$ is in set state or not. If the answer is "Yes", the program proceeds to step 210 where the CPU 60 reads out from the ROM 63 one of a second group of optimum assist powers Eo for mountain travel of the vehicle on a basis of the detected manual steering torque Tm and the detected vehicle speed V. At the following step 212, the CPU 60 produces an output signal indicative of the optimum assist power Eo. Thus, the differential amplifier 74 is applied with the output signal from the CPU 60 throrgh the D/A converter 64 to produce a control signal M indicative of a difference between a value of the instantaneous load current Id and the optimum assist power Eo, and the chopper 25 is applied with the control singal M to modulate the voltage applied to electric motor 16 in accordance with a value of the control signal M.

In the above embodiment, it is to be noted that the ROM 63 has two data storage tables one for the first group of optimum assist powers Eo which are prepared for street travel of the vehicle and the other for the second group of optimum assist powers Eo which are prepared for mountain travel of the vehicle. It is also to be noted that the main routine program (not shown) compulsorily sets the street travel flag $F_1$ only for a while after the driving start of the vehicle, and that the main routine program resets one of the flags $F_1$, $F_2$ while the other flag is set in accordance with the first program shown in FIG. 3.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An apparatus for detecting a driving condition such as street travel, mountain travel or highway travel of an automobile vehicle provided with an electrically power-assisted steering system which includes an electric motor drivingly connected to a steering shaft for applying thereto an assist power which is controlled in dependence upon a manual steering torque applied to the steering shaft, the apparatus comprising:

detection means for detecting a load applied to said electric motor and for producing a load signal indicative of the load;

ascertaining means responsive to the load signal at a predetermined interval for ascertaining whether or not a predetermined number of the load signals have been applied thereto;

calculation means for calculating a statistical variance of the predetermined number of the signals each time it is ascertained by said ascertaining means that the predetermined number of the signals have been applied thereto; and comparison means for comparing the calculated statistical variance with a reference value so as to discriminate among several types of roads such as a mountain road and a town street on which the vehicle is traveling.

2. An apparatus as claimed in claim 1, wherein said detection means comprises a load detection circuit connected to said electric motor for producing said load signal indicative of a load current of said electric motor when said electric motor is operated to rotate said steering shaft.

3. An apparatus as claimed in claim 1, wherein said ascertaining means is responsive to the load signal at each travel of the vehicle in a predetermined distance for ascertaining said predetermined number of the load signals applied thereto.

4. An apparatus as claimed in claim 1, wherein said calculation means comprises:

first calculation means for accumulating a square of the load signal value each time the load signal from said detection means is fed thereto;

second calculation means operable when it is ascertained by said ascertaining means that the predetermined number of the load signals have been detected, for dividing the accumulated square value by the predetermined number so as to calculate the statistical variance of said predetermined number of the load signals.

5. An apparatus as claimed in claim 4, wherein said comparison means includes:

first signal output means for outputting a first road signal when the statistical variance is smaller than the reference value; and second signal output means for outputting a second road signal when the statistical variance is larger than the reference value;

said first and second road signals respectively representing different types of roads on which the vehicle is traveling.

* * * * *